United States Patent
Yoo et al.

(10) Patent No.: US 9,254,743 B2
(45) Date of Patent: Feb. 9, 2016

(54) INNER SHAFT SUPPORTING APPARATUS OF VEHICLE POWER TRAIN

(71) Applicants: Hyundai Motor Company, Seoul (KR); Kia Motors Corporation, Seoul (KR)

(72) Inventors: Sung Su Yoo, Hwaseong-si (KR); Jang Ho Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/449,866

(22) Filed: Aug. 1, 2014

(65) Prior Publication Data
US 2015/0167744 A1    Jun. 18, 2015

(30) Foreign Application Priority Data

Dec. 18, 2013  (KR) .................. 10-2013-0158026

(51) Int. Cl.
| F16C 35/04 | (2006.01) |
| F16C 13/04 | (2006.01) |
| B60K 17/24 | (2006.01) |
| F16C 35/063 | (2006.01) |

(52) U.S. Cl.
CPC .............. *B60K 17/24* (2013.01); *F16C 35/047* (2013.01); *F16C 35/042* (2013.01); *F16C 35/063* (2013.01); *F16C 2226/60* (2013.01)

(58) Field of Classification Search
CPC .... F16C 19/04; F16C 33/786; F16C 33/7816; F16C 33/805; F16C 35/042; F16C 35/063; F16C 2226/60; F16D 3/24; B60K 17/24

USPC .......... 384/456, 488, 490, 536, 542; 248/200, 248/635; 464/167, 182; 385/559
See application file for complete search history.

(56) References Cited

U.S. PATENT DOCUMENTS

| 2,935,362 | A | * | 5/1960 | Diener | .......................... 384/536 |
| 3,003,831 | A | * | 10/1961 | King et al. | ..................... 384/536 |
| 3,483,768 | A | * | 12/1969 | Glass | .............................. 74/492 |
| 4,648,475 | A | * | 3/1987 | Veglia | ............................ 180/297 |
| 4,796,722 | A | * | 1/1989 | Kumagai | ...................... 384/541 |
| 6,729,455 | B2 | * | 5/2004 | Hirota et al. | .................. 180/382 |
| 6,736,362 | B2 | * | 5/2004 | Hahn | ............................. 248/300 |

(Continued)

FOREIGN PATENT DOCUMENTS

| EP | 1297986 A2 * | 4/2003 | ............ B60K 17/24 |
| JP | 10016585 A * | 1/1998 | ............ B60K 17/24 |

(Continued)

Primary Examiner — Marcus Charles
(74) Attorney, Agent, or Firm — Morgan, Lewis & Bockius LLP

(57) ABSTRACT

An inner shaft supporting apparatus of a vehicle power train may include a bracket coupled to a bearing, the bracket including a bearing coupling part, wherein an outer ring of the bearing may be seated in an inside of the bearing coupling part, and wherein an inner ring of the bearing may be press-fitted into to be integrally coupled to an inner shaft, and an upper coupling part and a lower coupling part disposed at upper and lower part thereof based on the bearing coupling part, respectively, wherein the upper coupling part and the lower coupling part may be fixedly coupled to a coupling part of the power train by a first bolt, and a separation preventing cover coupled to the bracket and the inner shaft to prevent the bearing from being separated from the bracket and an axial movement of the inner shaft integrally equipped with the bearing.

12 Claims, 16 Drawing Sheets

(56) References Cited

U.S. PATENT DOCUMENTS

| | | | |
|---|---|---|---|
| 6,913,105 B2 * | 7/2005 | Masuda et al. | 464/167 |
| 6,976,790 B2 * | 12/2005 | Min | 384/488 |
| 7,185,873 B2 * | 3/2007 | Suka et al. | 248/635 |
| 7,815,511 B2 * | 10/2010 | Habara | 464/134 |
| 8,439,150 B1 * | 5/2013 | Mesa | 384/499 |
| 8,544,591 B2 * | 10/2013 | Felchner et al. | 180/381 |
| 2013/0068921 A1 * | 3/2013 | Ikeda | 248/635 |
| 2015/0093062 A1 * | 4/2015 | Kim et al. | 384/490 |

FOREIGN PATENT DOCUMENTS

| | | | | |
|---|---|---|---|---|
| JP | 2002266904 A | * | 9/2002 | F16D 47/00 |
| JP | 2008-110682 A | | 5/2008 | |
| JP | 2008265406 A | * | 11/2008 | B60K 17/24 |
| KR | 10-2006-0017305 A | | 2/2006 | |
| KR | 10-2008-0037290 A | | 4/2008 | |
| KR | 10-2008-0103922 A | | 11/2008 | |

* cited by examiner

INNER SHAFT SUPPORTING APPARATUS OF VEHICLE POWER TRAIN

CROSS-REFERENCE TO RELATED APPLICATION

The present application claims priority to Korean Patent Application No. 10-2013-0158026 filed on Dec. 18, 2013, the entire contents of which is incorporated herein for all purposes by this reference.

BACKGROUND

1. Field of the Invention

The present invention relates to an inner shaft supporting apparatus of a vehicle power train. More particularly, the present invention relates to an inner shaft supporting apparatus of a vehicle power train, which can improve noise and vibration limitations by improving the natural frequency and the dynamic stiffness of a bracket assembled to support a bearing of the inner shaft.

2. Description of Related Art

A power train of a vehicle denotes all apparatuses that are connected in a process of delivering power generated in a power unit to a drive wheel, and includes a clutch and a transmission, a shaft (output axis), a final reduction gear, and differential gears.

The term 'power train' refers to apparatuses that generate power and deliver it, and is being used as a meaning including an engine or a drive motor that actually generates power.

FIG. 1 is a perspective view illustrating important components among a power train of a vehicle, which include an engine 1, a transmission 2, an inner shaft 3, and a drive shaft 4. In the case of an electric vehicle, the engine and the transmission are replaced with a drive motor and a decelerator.

In the above configuration, the inner shaft 3 has an end portion coupled to a side gear of the transmission 2 or the decelerator by a spline coupling method so as to receive power, and another end portion coupled to the drive shaft 4 via a constant velocity joint so as to deliver power.

In the power train of a vehicle, the inner shaft 3 is mounted in the engine 1 using bearings and brackets. Hereinafter, a supporting apparatus of the inner shaft 3 will be described as follows.

FIG. 2A and FIG. 2B are perspective views illustrating an inner shaft and a supporting apparatus thereof. The supporting apparatus 10 is a structure for rotatably supporting and coupling the inner shaft 3 to the engine 1, and includes a bracket 11 and a bearing 15.

Referring to FIG. 2A and FIG. 2B, the supporting apparatus 10 including the bracket 11 and the bearing 15 is mounted at the end portion of the inner shaft 3 connected to the drive shaft 4 through the constant velocity joint. In this case, the inner shaft 3 is press-fitted into the inner ring 16 of the bearing 15, and the outer ring 17 of the bearing 15 is press-fitted into a bearing coupling part of the bracket 11.

Also, the end portion of the bracket 11 is fixedly coupled to the coupling part 1a of the engine using bolts. Finally, the one end portion of the inner shaft 3 is coupled to the transmission 2 or the decelerator to be supported, and another end portion of the inner shaft 3 to which the constant velocity joint is coupled to the engine 1 to be supported by the supporting apparatus 10, i.e., the bracket 11 and the bearing 15.

FIG. 3A and FIG. 3B are views illustrating a bracket of a typical inner shaft supporting apparatus, and FIG. 4A, FIG. 4B, FIG. 4C and FIG. 4D are views illustrating various examples of a bracket of a typical inner shaft supporting apparatus.

FIG. 3A and FIG. 3B and FIG. 4A, FIG. 4B, FIG. 4C and FIG. 4D illustrate examples of typical brackets 11. As shown in FIG. 4A, FIG. 4B, FIG. 4C and FIG. 4D, the brackets 11 somewhat differ from each other in detailed shape, but are configured to have a structure in which the upper part or the lower part of the bracket 11 can be coupled to the engine 1 by bolts.

Referring to FIG. 3A and FIG. 3B, an upper three-piece coupling structure (a and c) and an upper two-piece coupling method (d) in which bolts are coupled to the upper part of the bracket 11, and a lower three-piece coupling structure (b) in which bolts are coupled to the lower part of the bracket 11 are shown.

The bracket 11 shown in FIG. 3A and FIG. 3B has an upper three-piece coupling structure, where bolts are coupled to upper three apertures 11a for fixation with the engine coupling part and dowel pins are coupled to another two apertures.

The bracket 11 includes a coupling part 12 disposed at one side thereof to be coupled to the engine 1 that is a fixed structure and a bearing coupling part 13 disposed at another side thereof to be coupled to the bearing.

Accordingly, the bracket 11 supports the inner shaft 3 by a cantilever supporting method in which only an upper or lower part is coupled to the fixed structure (engine) based on the bearing center.

In this case, the bearing coupling part 13 of the bracket 11 is coupled to the outer ring 17 of the bearing 15 by the press-fit method, and the inner shaft 3 is coupled to the inner ring 16 by the press-fit method. The bracket 11 and the bearing 15 assembled by the foregoing method rotatably support the inner shaft 3 with respect to the fixed structure (engine).

Also, in the assembling of the inner shaft 3, the bracket 11 and the bearing 15 are first assembled into the inner shaft by the press-fit method, and then the integrated inner shaft 3, bracket 11, and bearing 15 is coupled to the transmission (or decelerator) 2 and the engine 1, respectively.

Meanwhile, although the rib shape of the bracket is optimally reinforced, a supporting apparatus according to a related art has a limitation in that the natural frequency of the bracket cannot increase due to the structural limitation of the cantilever supporting method. Accordingly, a separation from the excitation frequency of engine explosion is impossible, and thus a resonance of the bracket occurs due to the excitation of the engine explosion, causing noise and vibration.

As shown in FIG. 3A and FIG. 3B, the resonance allows the bracket 11 to vibrate in upward and downward directions, left and right directions, and forward and backward directions shown as arrows in FIG. 3A and FIG. 3B, delivering amplified (resonant) vibration to the vehicle body and thus generating noise.

Although the rib is reinforced in the cantilever-typed bracket, the target of the natural frequency is difficult to satisfy. Accordingly, noise and vibration limitations occur. Even though the target of the natural frequency is satisfied, the vibration is amplified when the natural frequency is close to the excitation frequency of the engine.

In order to overcome the foregoing limitation, the dynamic stiffness of the bracket needs to be increased, but there is a limitation on the cantilever structure in which only an upper or lower part of the bracket is coupled to the engine that is a fixed structure, and particularly, if implemented, the weight significantly increases.

Also, in order to overcome the limitation on the cantilever structure, a both-end supporting structure in which both upper and lower parts of the bracket are coupled needs to be applied. However, in the method in which the inner shaft 3, the bracket 11, and the bearing 15 are first assembled into one body and then finally assembled with the power train, the application of the cantilever structure is inevitable, and the application of both upper and lower parts coupling structure is difficult.

Under the operational conditions of the drive shaft 4, since the lifespan of the bearing is long when both of the inner ring 16 (inner shaft is press-fitted into) and the outer ring 17 (press-fitted into the bearing coupling part of the bracket) of the bearing 15 are assembled by the press-fit method, the inner shaft 3, the bracket 11, and the bearing 15 are coupled into one body, and then finally coupled to the power train.

The structure design and assembly are performed in consideration of the engine auxiliary machinery and accessories, and the exhaust system. In the assembly method, one end portion of the inner shaft 3 is coupled to the transmission 2, and then the bracket is rotated to be seated in an engine coupling part 1a. Thereafter, the bracket is fixedly coupled to the engine coupling part 1a by bolts, and then the drive shaft 4 and the inner shaft 3 are assembled.

FIG. 5 illustrates limitations according to a related art. FIG. 5A illustrates a bracket 11 having a both upper and lower parts coupling structure. FIGS. 5B and 5C show that an interference with an engine coupling part (boss at the side of power train) 1a that is a fixed structure occurs when the bracket with a both-end coupling structure rotates.

As shown in the drawings, the inner shaft 3, the bracket 11, and the bearing 15 are first assembled into one body, and then the bracket 11 is coupled to the power train (engine). In the both-end coupling structure, when the coupling part 12 of the bracket 11 is seated in the engine coupling part 1a, an interference between the coupling part 12 of the bracket 11 and the engine coupling part 1a occurs, making it impossible for the bracket 11 to rotate.

Accordingly, there is a difficulty in installing of the inner shaft first coupled with the bracket and the bearing. In order to overcome this assembly limitation, a bracket with a cantilever structure is being applied in a typical inner shaft supporting apparatus in spite of the disadvantages in terms of the natural frequency and the dynamic stiffness because the bracket with the cantilever structure can be rotated and seated without an interference with the engine coupling part.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an inner shaft supporting apparatus of a vehicle power train, which can improve noise and vibration limitations by improving the natural frequency and the dynamic stiffness of a bracket assembled to support a bearing of the inner shaft.

The present invention also provides a new coupling type of bracket application structure which can be improved in assembly characteristics even by applying a both-end coupling method in which both upper and lower parts are coupled to a power train fixed structure to overcome limitations of a cantilever-typed bracket.

In an aspect of the present invention, an inner shaft supporting apparatus of a vehicle power train may include a bracket coupled to a bearing, the bracket having a bearing coupling part, wherein an outer ring of the bearing is seated in an inside of the bearing coupling part, and wherein an inner ring of the bearing is press-fitted into to be integrally coupled to an inner shaft, and an upper coupling part and a lower coupling part disposed at upper and lower part thereof based on the bearing coupling part, respectively, wherein the upper coupling part and the lower coupling part are fixedly coupled to a coupling part of the power train by a first bolt, and a separation preventing cover coupled to the bracket and the inner shaft to prevent the bearing from being separated from the bracket and an axial movement of the inner shaft integrally equipped with the bearing.

The bearing coupling part of the bracket is formed in a shape of a ring to receive the bearing coupled to the inner shaft, and the upper coupling part and the lower coupling part having bolt coupling apertures to receive the first bolt are integrally formed on the bearing coupling part.

The separation preventing cover is coupled to a side of the bearing and covers a side surface of the bearing so as to prevent foreign substances and moisture from being introduced into a coupling part between the inner shaft and a constant velocity joint and the bearing coupling part.

The separation preventing cover may have one side thereof coupled to the bracket by a second bolt, and another side thereof fixedly inserted into a groove formed in an inner circumferential surface of the bearing coupling part of the bracket.

The separation preventing cover may include a tube formed such that a housing tube of a constant velocity joint coupled to the inner shaft is inserted into an inside of the tube while having a gap, a flange integrally formed at one side end of the tube and engaging with the groove, and a bolt coupling part integrally and longitudinally extending from the flange or the tube to be coupled to an outer side surface of the bearing coupling part of the bracket by the second bolt.

The groove of the bracket engaging with the flange is formed to have a circular arc shape only in at least a portion of a whole inner circumferential surface of the bearing coupling part.

The bolt coupling part of the separation preventing cover is coupled to a front surface of the bearing coupling part among an outer side surface of the bearing coupling part by the second bolt while overlapping the front surface of the bearing coupling part.

The groove is formed only in a rear portion of the whole inner circumferential surface of the bearing coupling part.

The inner shaft supporting apparatus may further include a dust cover coupled to the inner shaft and located on a side of the bearing at an opposite side of the separation preventing cover based on the bearing, so as to prevent foreign substances and moisture from being introduced while covering a gap between the inner shaft and the bearing coupling part.

The inner shaft supporting apparatus may further include a stopper restricting the axial movement of the bearing and the inner shaft by a stopping action of the outer ring of the bearing at an opposite side of the bearing coupling part of the bracket to the separation preventing cover.

An offset is provided between a coupling aperture formed in the bearing coupling part of the bracket and the coupling aperture formed in the bolt coupling part of the separation preventing cover to allow the bolt coupling part of the separation preventing cover to be pressurized on a side surface of the bearing coupling part of the bracket while being deformed in a lateral direction when the coupling aperture of the bracket and the coupling aperture of the bolt coupling part are coupled by the first bolt.

A rib is connected to the upper coupling part, the bearing coupling part, and the lower coupling part.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
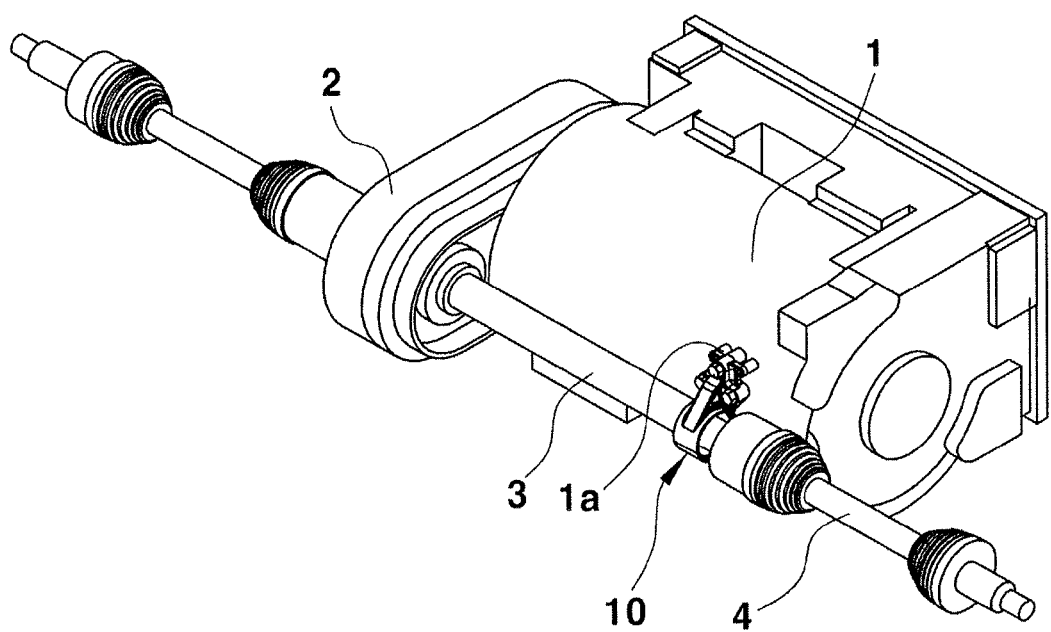
FIG. 1 is a perspective view illustrating important components among a power train of a vehicle, which shows the installation state of a typical inner shaft supporting apparatus.
Figure 2A:
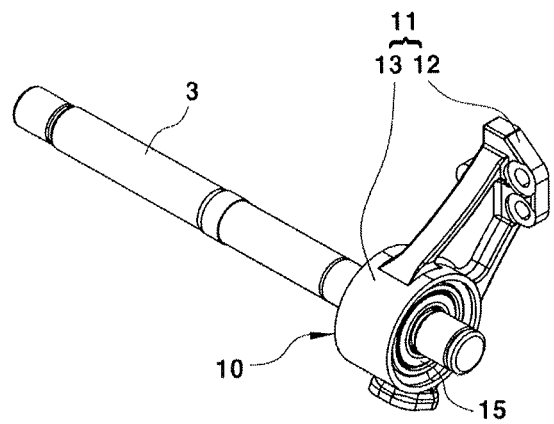
FIG. 2A and FIG. 2B are perspective views illustrating a typical inner shaft and supporting apparatus thereof.
Figure 2B:
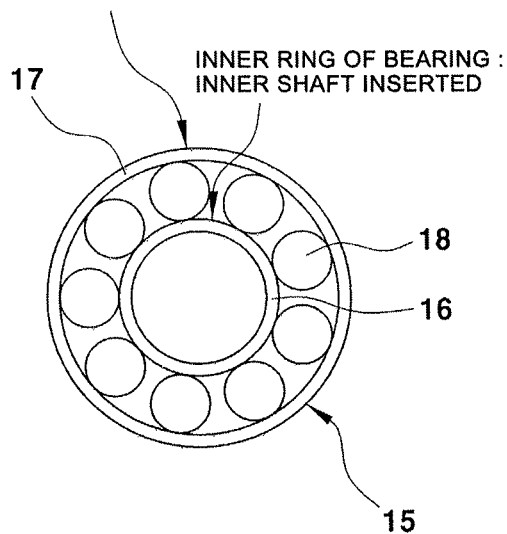
Figure 3A:
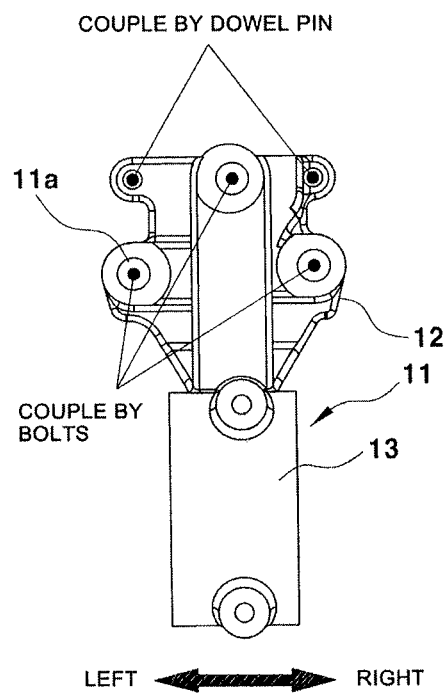
FIG. 3A and FIG. 3B are views illustrating a bracket of a typical inner shaft supporting apparatus.
Figure 3B:
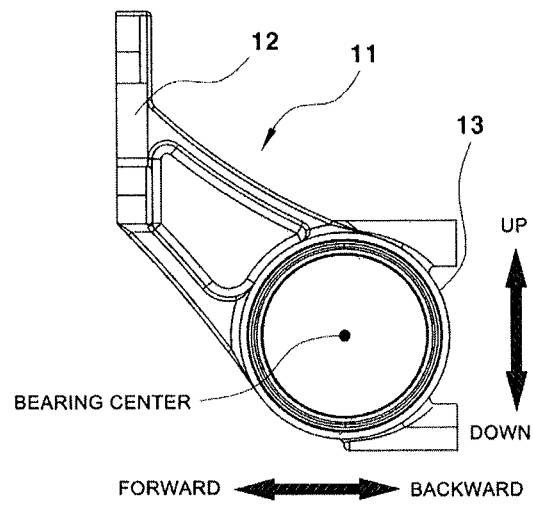
Figure 4A:
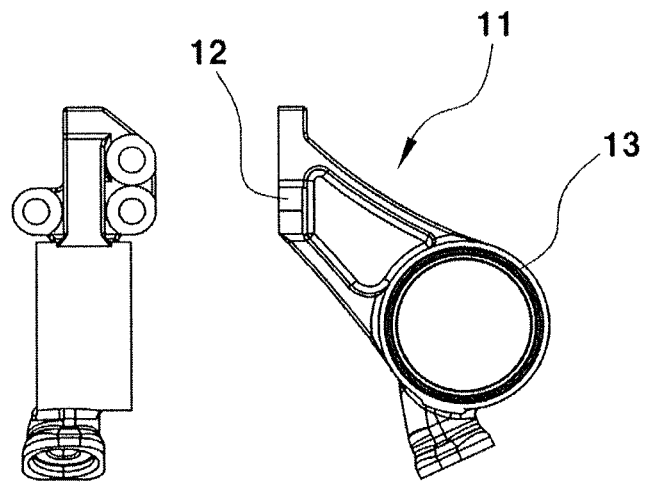
FIG. 4A, FIG. 4B, FIG. 4C and FIG. 4D are views illustrating various examples of a bracket of a typical inner shaft supporting apparatus.
Figure 4B:
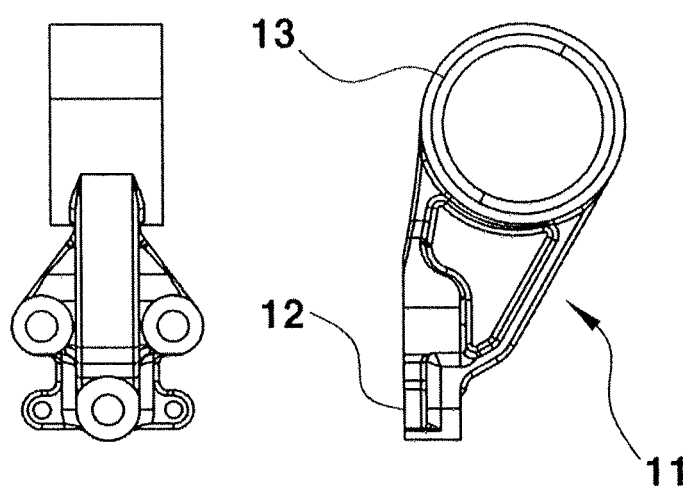
Figure 4C:
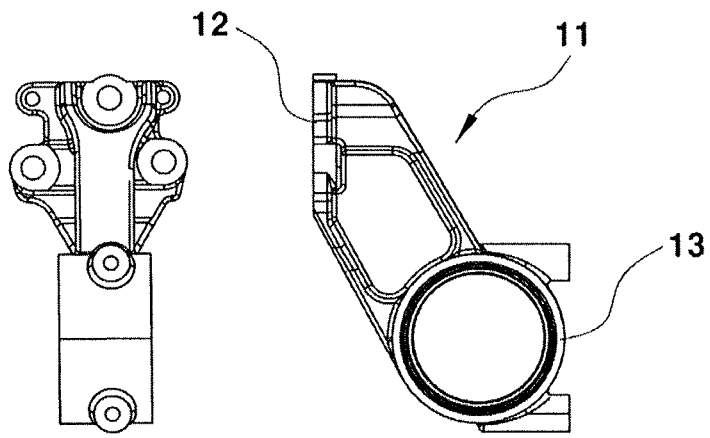
Figure 4D:
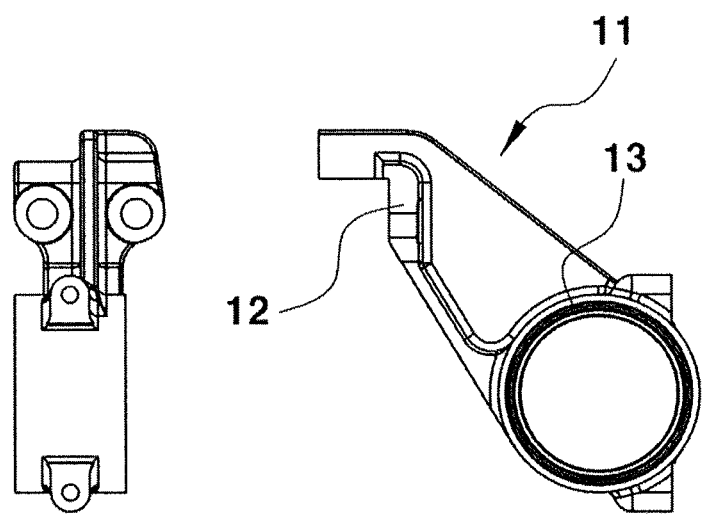
Figure 5A:
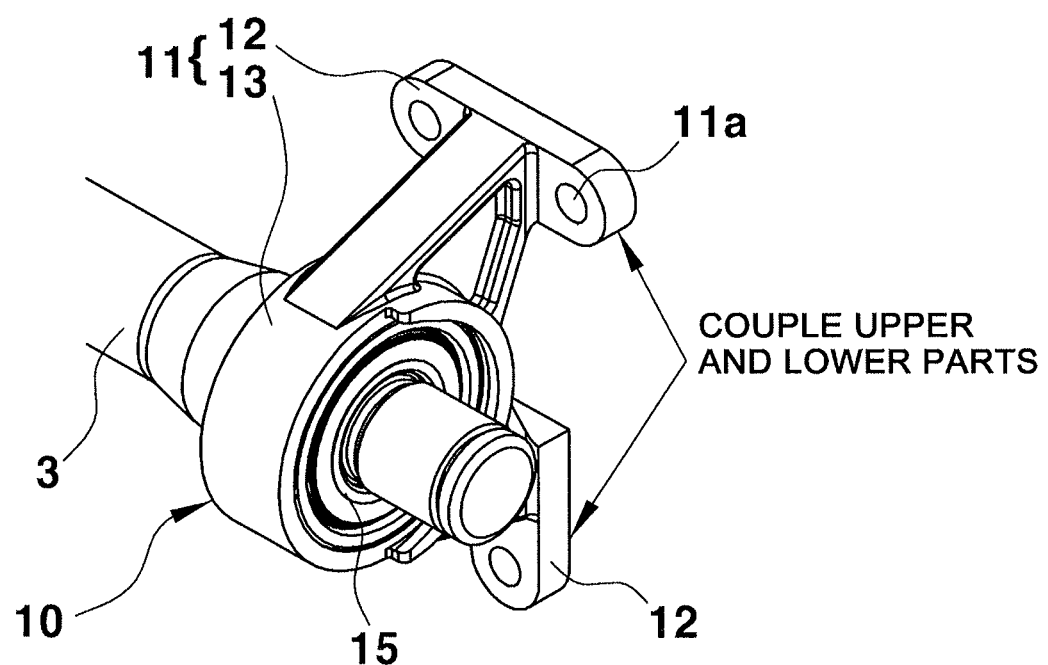
FIG. 5A, FIG. 5B, FIG. 5C and FIG. 5D are views for describing limitations according to a related art.
Figure 5B:
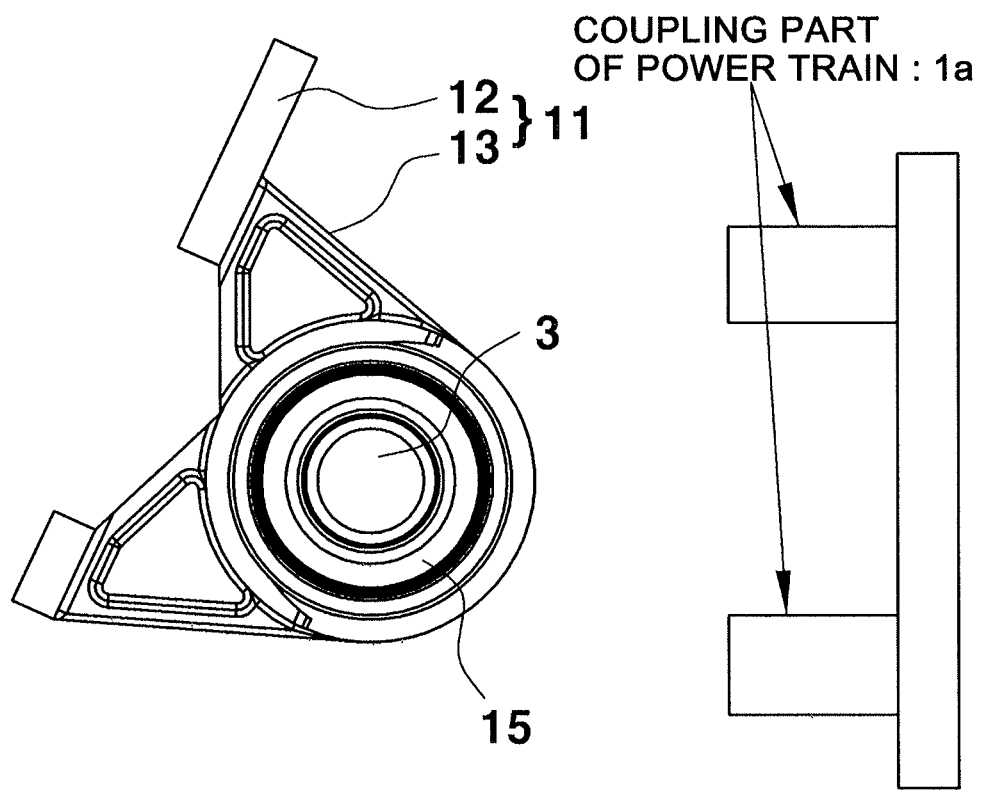
Figure 5C:
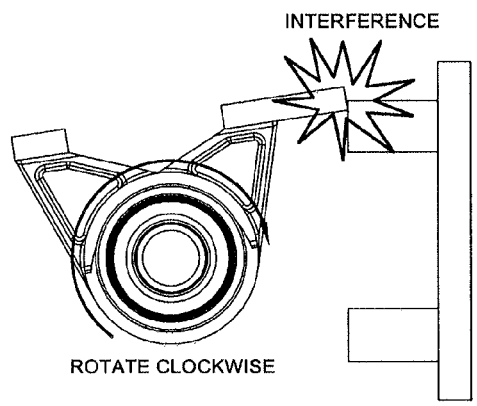
Figure 5D:
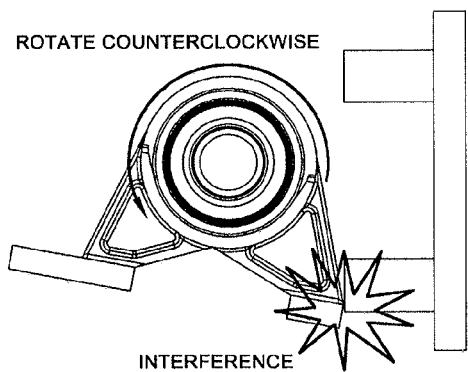

Reference numerals set forth in the Drawings includes reference to the following elements as further discussed below:

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

Hereinafter, exemplary embodiments of the present invention will be described in detail with reference to the accompanying drawings so that those skilled in the art can easily carry out the present invention.

The present invention provides an inner shaft supporting apparatus of a vehicle power train, which can improve noise and vibration limitations by improving the natural frequency and the dynamic stiffness of a bracket assembled to support a bearing of the inner shaft.

In an exemplary embodiment, in order to overcome limitations occurring when a bracket with a cantilever structure is applied, a bracket with a both-end coupling structure in which both upper and lower parts are coupled to a fixed structure (coupling part of power train described later) of a power train may be used instead of the bracket with the cantilever structure.

Also, in order to improve a limitation in that the application of the bracket with both upper and lower parts coupled is impossible due to a limitation of assembly characteristics in a typical integral structure (inner shaft, bearing, and bracket are integrally assembled in advance), a method in which the bracket and the bearing are separately assembled may be applied.

Here, the bracket may be coupled in advance to an engine coupling part (coupling boss of engine) that is a fixed structure of a power train, and then the bearing coupled to the inner shaft (inner ring press-fitted into outer circumferential surface of inner shaft) may be coupled to the bracket coupled in advance to the engine coupling part.

Also, to secure the lateral supporting force regarding the bearing integrally coupled to the inner shaft and prevent the lateral movement of the inner shaft and the lateral separation of the bearing from the bracket, a separation preventing cover may be coupled to the bracket so as to be disposed at the side of the bearing.

Hereinafter, an inner shaft supporting apparatus according to an exemplary embodiment of the present invention will be described in detail.

Figure 6:
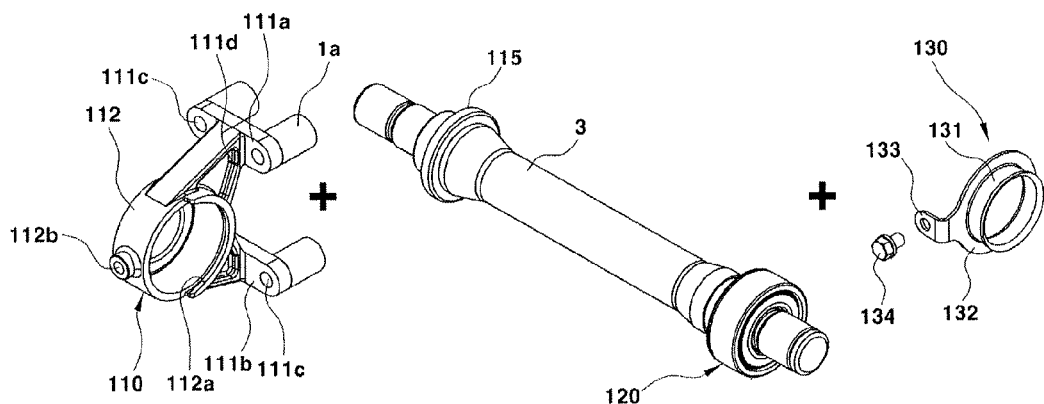
FIG. 6 is a view illustrating components of an inner shaft supporting apparatus according to an exemplary embodiment of the present invention.
Figure 7:
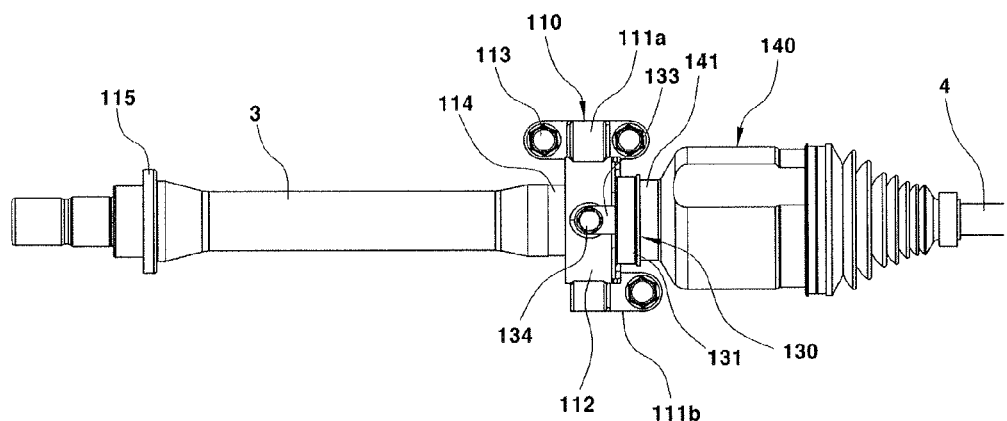
FIG. 7 is a view illustrating an assembly state of an inner shaft supporting apparatus according to an exemplary embodiment of the present invention.

FIG. 6 is a view illustrating components of an inner shaft supporting apparatus according to an exemplary embodiment of the present invention. FIG. 7 is a view illustrating an assembly state of an inner shaft supporting apparatus according to an exemplary embodiment of the present invention.

Figure 8:
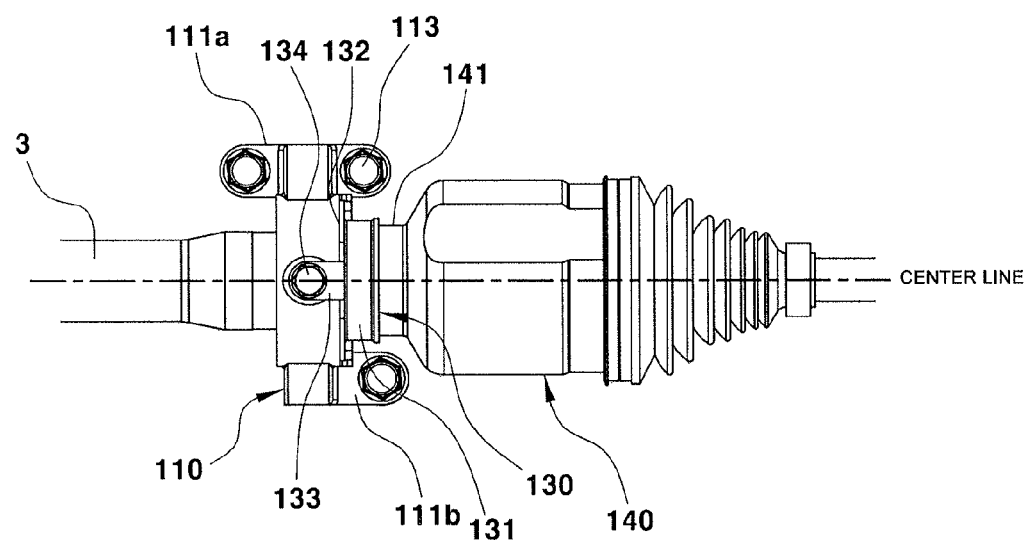
FIG. 8 is a front view illustrating an assembly state of an inner shaft supporting apparatus according to an exemplary embodiment of the present invention.
Figure 9:
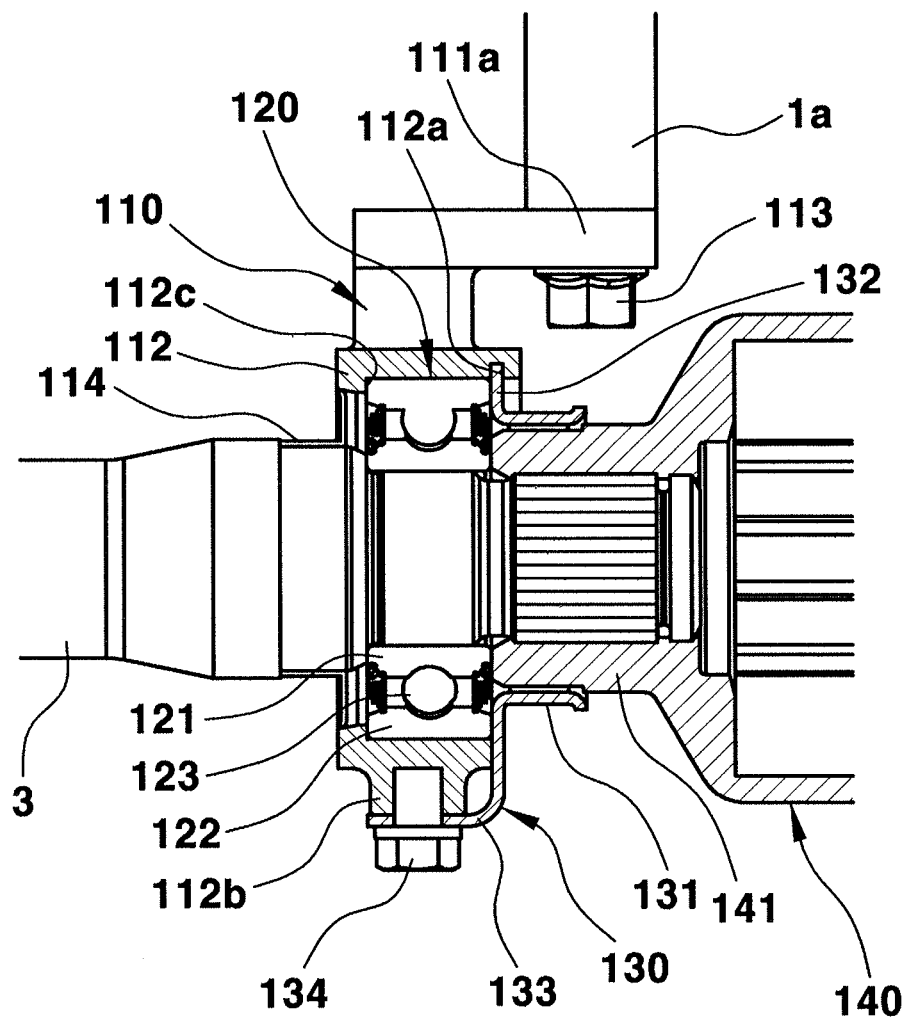
FIG. 9 is a cross-sectional view illustrating an assembly state of an inner shaft supporting apparatus according to an exemplary embodiment of the present invention.

FIG. 8 is a front view illustrating an assembly state of an inner shaft supporting apparatus according to an exemplary embodiment of the present invention. FIG. 9 is a cross-sectional view illustrating an assembly state of an inner shaft supporting apparatus according to an exemplary embodiment of the present invention.

An inner shaft supporting apparatus according to an exemplary embodiment of the present invention may include a bracket 110 coupled in advance to a coupling part (engine coupling part) 1a of a power train by a upper and lower parts coupling method, a bearing 120 coupled in advance to an inner shaft 3 and inserted into a bearing coupling part 112 of the bracket 110 coupled to the coupling part 1a of the power train, and a separation preventing cover 130 coupled to a side of the bracket 110 to prevent a lateral separation of the bearing 120 and an axial movement of the inner shaft 3.

Here, the bracket 110 may include an upper coupling part 111a and a lower coupling part 111b coupled to the coupling part 1a of the power train by bolts, and a bearing coupling 112 having a ring shape and receiving the bearing integrally coupled to the inner shaft 3.

The upper coupling part 111a and the lower coupling part 111b may have coupling apertures 111c to be coupled to the coupling part (coupling boss) 1a of the power train. In FIG. 6, the upper coupling part 111a may have two apertures 111c and the lower coupling part 111b may have one aperture 111c.

In an exemplary embodiment, the bracket 110 may have a coupling structure in which two pieces of coupling structure are at the upper part and one piece of coupling structure is at the lower part. The detailed shapes (including shape of rib described later) of the upper coupling part 111a and the lower coupling part 111b and the number (number of bolt coupling pieces) of coupling apertures 111c may be variously changed.

For example, the upper coupling part 111a and the lower coupling part 111b may have two coupling apertures, respectively. That is, the bracket 110 may have two upper coupling pieces and two lower coupling pieces.

Also, the upper coupling part 111a and the lower coupling part 111b may be integrally formed at the upper part and the lower part of the bearing coupling part 112 of the bracket 110. At least one of the upper coupling part 111a and the lower coupling part 111b may include a rib 111d to secure the stiffness.

The bearing coupling part 112 may be formed to have a size such that the bearing 120 can be inserted into the inside thereof. In this embodiment, the outer ring (122 of FIG. 9) of the bearing 120 may be inserted into the inside of the bearing coupling part 112 by a loose-fit method.

The inner shaft 3 may be inserted into the inner ring (121 of FIG. 9) of the bearing by a press-fit method, and in this case, the outer ring 122 of the bearing 120 may be inserted into the inner circumferential surface of the bearing coupling part 112 of the bracket 110 by the loose-fit method.

In this embodiment, the bracket 110 may employ an upper and lower parts coupling method (both-end coupling method) for securing the stiffness. In order to improve the assembly characteristics, the bracket 110 and the bearing 120 may be separately assembled.

The bracket 110 may be coupled in advance to the coupling part 1a of the power train, and the bearing 120 may be press-fitted into the outer circumference of the inner shaft 3. Thereafter, the bearing and the bearing that are integrally assembled may be inserted into the inside of the bearing coupling part 112 of the bracket 110 coupled to the coupling part 1a of the power train.

Thus, the inner shaft supporting apparatus according to the exemplary embodiment of the present invention may improve the dynamic stiffness and the natural frequency characteristics of a bracket compared to a typical bracket with a cantilever structure, and thus may improve vibration and noise limitations, by adopting a method in which the bracket, which is impossible to couple at the upper part and the lower part thereof due to a limitation of assembly characteristics, and the bearing are separately coupled in advance to the coupling part 1a of the power train and applying a bracket of a both-end coupling structure in which both upper and lower parts are coupled based on the bearing center.

Accordingly, in this embodiment, the bracket may be manufactured without a reduction of the dynamic stiffness and natural frequency characteristics using a light weight material, for example, a material such as aluminum alloy, magnesium alloy, or engineering plastic instead of a typical cast iron material.

In this case, the weight can be reduced compared to a typical alloy steel.

Since the bracket 110 allows both upper and lower parts thereof to be coupled to the coupling part 1a of the power train by the upper and lower parts coupling method, the dynamic stiffness and natural frequency characteristics can be improved.

Particularly, since the natural frequency can be improved compared to a typical cantilever structure, although a light weight material is used, the dynamic stiffness and the natural frequency can be improved compared to a cast iron bracket with a cantilever structure, and the weight lightening and the cost reduction can be achieved.

The outer ring of the bearing 120 press-fitted into the inner ring of the inner shaft 3 may be coupled to the inside of the bearing coupling part 112 of the bracket 110 coupled to the coupling part 1a of the power train by the loose-fit method, and then the separation preventing cover 130 that restricts the outward movement (lateral separation of bearing and axial movement of inner shaft) of the bearing 120 may be coupled in order to prevent a situation (when a force that pulls the inner shaft in the axial direction of the outside (right side in the drawing) of the bracket occurs) of the axial separation of the inner shaft 3 due to vibration, shock, suspension wheel stroke movement, and steering.

The separation preventing cover 130 may have one side coupled to the outer side surface of the bearing coupling part 112 of the bracket 110 by bolts and another side fitted into a groove 112a formed in the inner circumferential surface of the bearing coupling part 112 by a groove-fitting method.

The separation preventing cover 130 may include a tube 131 having a size such that a housing tube 141 of a constant velocity joint 140 spline-coupled to the end portion of the inner shaft 3 can be inserted into the inside of the tube 131 while having a gap, a flange 132 integrally formed at one side end of the tube 131, and a bolt coupling part 133 integrally extending from the flange 132 or the tube 131 to be coupled to a coupling part 112b formed at the front surface of the bracket 110 by a bolt 134.

Referring to FIG. 6, the bolt coupling part 133 may be bent in a lateral direction to overlap the coupling part 112b on the front surface of the bracket (bearing coupling part) 110. The bolt coupling part 133 and the coupling part 112b on the front surface of the bracket 110 may have a coupling aperture receiving the bolt 134, respectively.

Accordingly, the bolt coupling part 133 may be joined to the coupling part 112b on the front surface of the bracket 110 (in this case, both coupling apertures are aligned), and then the bolt 134 may penetrate the coupling aperture of the bracket 110 and the coupling aperture of the bolt coupling part 133 to fix the separation preventing cover 130.

In addition, an edge portion of the flange 132 may be fitted into a groove 112a formed along the inner circumferential surface of the bearing coupling part 112 of the bracket 110. When the edge portion of the flange 132 of the separation preventing cover 130 is inserted into the groove 112a, in addition to the bolt coupling structure, the groove 112 may serve as a stopper to allow the separation preventing cover (flange) 130 to be fixed. Accordingly, the separation preventing cover 130 can be stably fixed only by a single bolt coupling point (one coupling aperture and one bolt).

In this embodiment, the coupling part 112b of the bearing coupling part 112 coupled to the bolt coupling part 133 of the separation preventing cover 130 by a bolt may be formed to be located on the front surface of the bearing coupling part 112. In addition, the groove 112a to which the flange 132 of the separation preventing cover 130 is coupled may be formed in at least a portion of the inner circumferential surface of the bearing coupling part 112, particularly, in a portion of the rear part of the inner circumferential surface to form a circular arc.

The separation preventing cover 130 may serve to prevent the lateral movement (axial movement) and the lateral separation of the bearing 120 with respect to the bracket 110 while basically providing a lateral supporting force (axial supporting force) with respect to the bearing 120 coupled to the inner shaft 3 in a state of being fixed to the bracket 110.

Also, since the separation preventing cover 130 is installed in a structure that can cover the side surface of the bearing 120, the separation preventing cover 130 may serve as a dust cover that prevents foreign substances and moisture from being introduced into a coupling part (coupling part between a male spline of the end portion of the inner shaft and a female spline of the constant velocity joint housing tube) between the inner shaft 3 and the constant velocity joint 140 and the bearing part.

The separation preventing cover 130 may become a structure that restricts the axial movement of the bearing (inner shaft) from the bracket 110 in the right direction of the drawing. In this case, a structure than restricts the axial movement of the bearing 120 in the opposite direction, i.e., the left direction of the drawing may be necessary or not according to the specifications.

When the structure that restricts the axial movement of the bearing (inner shaft) in the left direction on the drawing is needed, as shown in FIG. 9, a stopper 112c having an inwardly protruding structure on the side end portion of the bearing coupling part 112 of the bracket 110 may be longitudinally disposed along the circumferential direction.

Similarly to the separation preventing cover 130 that restricts the axial movement of the bearing in the right direction on the drawing, the stopper 112c may allow the outer ring 122 to be stopped at the opposite side of the separation preventing cover 130, restricting the axial movement of the bearing (inner shaft) in the left direction on the drawing.

The stopper 112c will be described later with reference to the drawings.

Also, based on the bearing 120, a separate dust cover 114 may be coupled to the opposite side (left side on the drawing) to the location where the separation preventing cover 130 is coupled. The separate dust cover 114 may be coupled to the inner shaft 3 before the inner shaft 3 and the bearing 120 are coupled to the bracket 110.

The dust cover 114 may be coupled to the outer circumference of the inner shaft 3 so as to be disposed at the side of the bearing 120 (so as to be disposed at the opposite side to the separation preventing cover). In this case, the dust cover 114 may be manufactured to have a shape that can cover a part between the outer circumferential surface of the inner shaft 3 and the bearing coupling part 112 of the bracket 110.

While the separation preventing cover 130 protects the right part of the bearing 120 on the drawing and the spline coupling part of the inner shaft 3, the dust cover 114 may serve to protect the left part of the bearing on the drawing from foreign substances and moisture.

Finally, based on the bearing 120, the dust cover 114 and the separation preventing cover 130 that are located at the opposite side to each other may perform a cover function of surrounding the bearing 120 at the left and right sides, respectively.

The reference numeral 115 of FIG. 7 indicates a separate dust cover disposed at the coupling part of the inner shaft 3 with a transmission (or decelerator), which may also be coupled to the outer circumference of the inner shaft 3.

Figure 10:
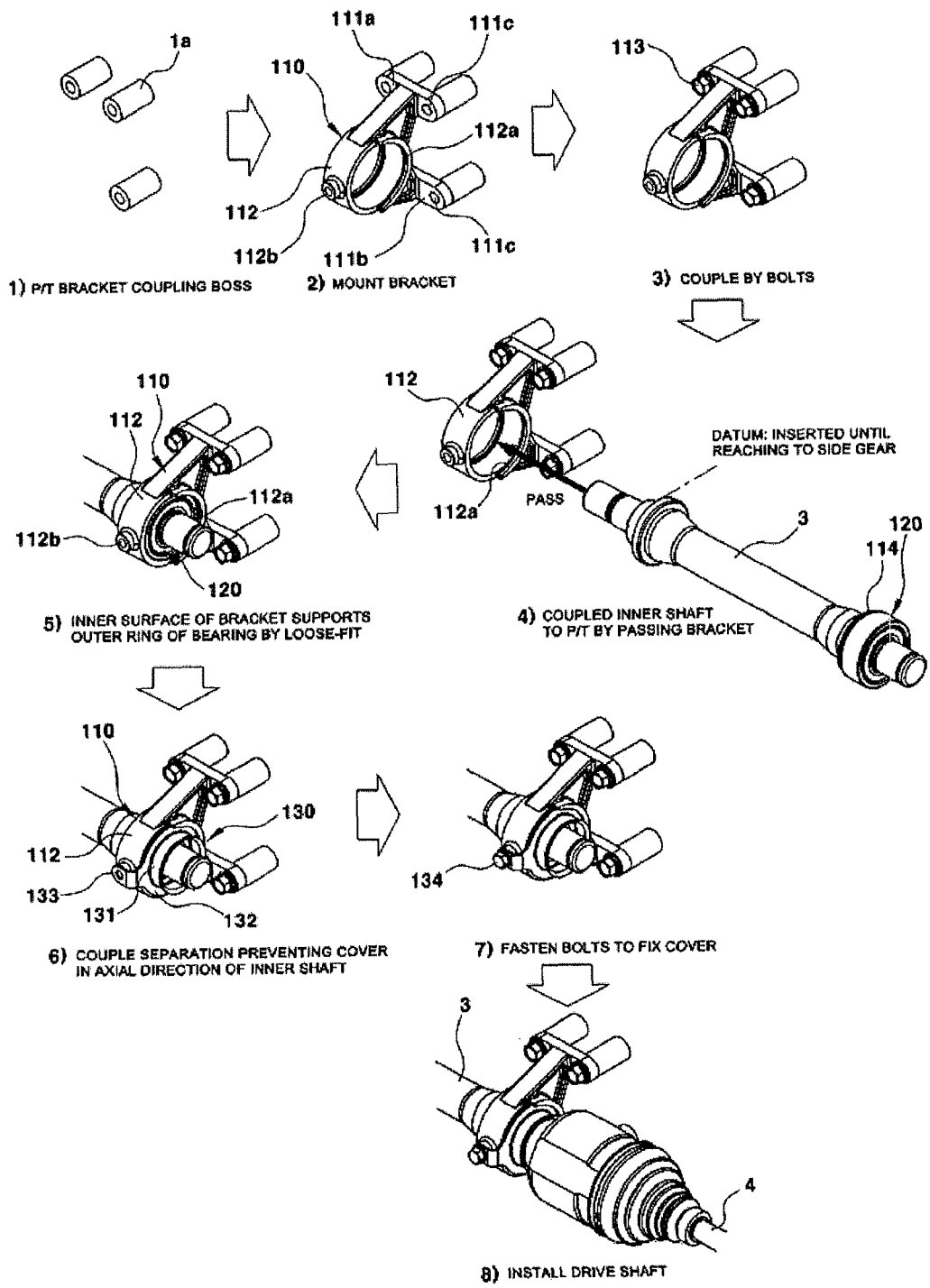
FIG. 10 is a view illustrating an assembly method of an inner shaft supporting apparatus according to an exemplary embodiment of the present invention.

FIG. 10 illustrates an assembly method when the inner shaft supporting apparatus according to the exemplary embodiment is applied. First, the bracket 110 may be coupled to the coupling part (coupling boss pre-installed at the coupling part of engine) 1a of the power train by bolts to install the inner shaft 3.

In this case, the coupling aperture 111c of the upper coupling part 111a and the lower coupling part 111b of the bracket 110 may be aligned with the coupling aperture of the coupling part 1a of the power train, and then the bolt 113 may be inserted into each coupling aperture.

Next, the inner shaft 3 may be inserted into the inside of the bearing coupling part 112. In this case, the inner shaft 3 may be integrally coupled in advance to the dust cover 114 and the bearing 120 (inner shaft press-fitted into the inner ring of the bearing). The inner shaft 3 may pass the inside of the bearing coupling part 112 until the bearing 120 integrally assembled is seated in the inside of the bearing coupling part 112.

Consequently, the outer ring 122 of the bearing 120 may be seated and supported on the inside of the bearing coupling part 112 of the bracket 110 by the loose-fit method.

Also, when the bearing 120 integrally coupled to the inner shaft 3 is coupled to the bearing coupling part 112 of the bracket 110, one end portion of the inner shaft 3 may be inserted into the transmission (or decelerator) such that the one end portion of the inner shaft 3 engages with a side gear.

In this case, when a datum (reference surface) prepared on the one end portion of the inner shaft 3 reaches the side gear or contacts internal components (including gears) of the transmission, the inner shaft 3 may not be inserted or move to the transmission anymore. In this case, the bearing 120 may accurately reach an inner location of the bearing coupling part 112 of the bracket.

Accordingly, when the separation preventing cover 130 is installed only at one side of the bearing 120, although there is no stopper of the bearing coupling part 112 at the opposite side, the axial movement of the inner shaft 3 may be restricted.

Thus, when the datum that restricts the insertion or movement of the inner shaft 3 to the transmission by contacting the side gear or other internal components of the transmission exists on one end portion of the inner shaft 3, there is no need to form a separate stopper for restricting the movement of the inner shaft 3 to the transmission at the bearing coupling part 112 of the bracket 110.

Figure 11:
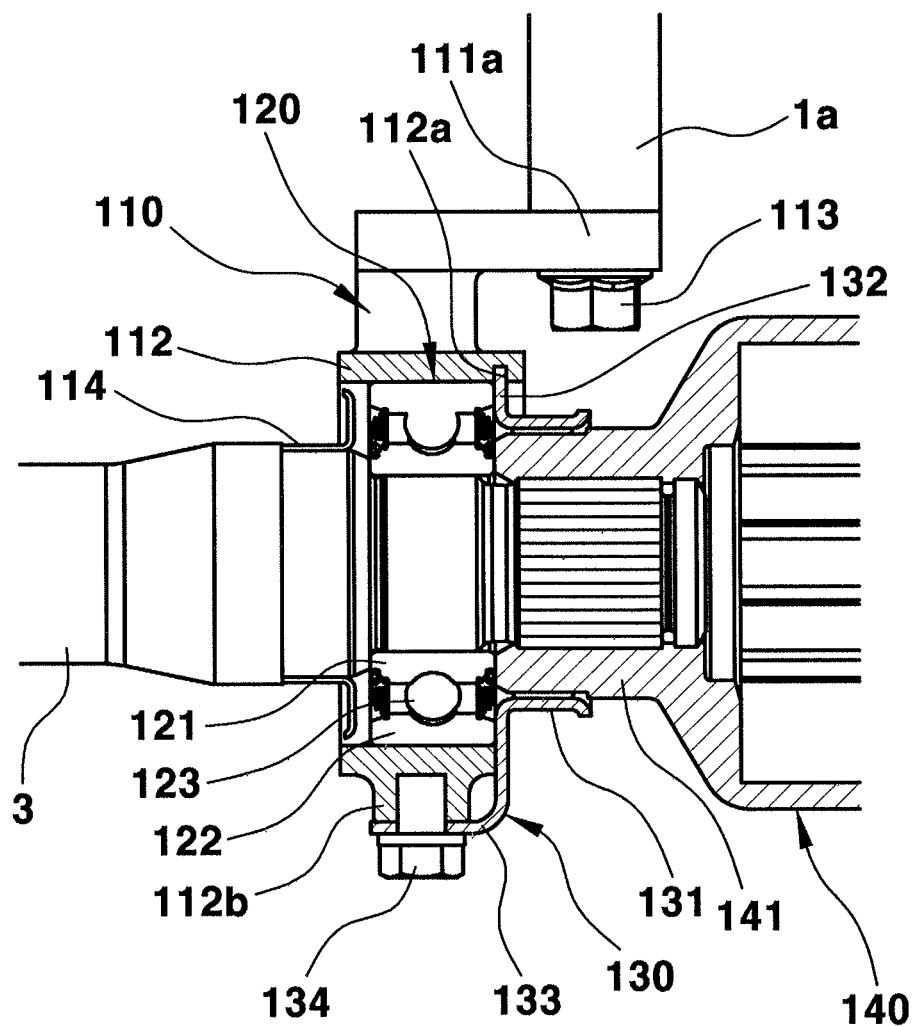
FIG. 11 is a cross-sectional view illustrating a bracket without a stopper on a bearing coupling part according to an exemplary embodiment of the present invention.

FIG. 11 is a cross-sectional view illustrating a bracket 110 without a stopper on a bearing coupling part 112 according to an exemplary embodiment of the present invention.

On another hand, in the case of through-type inner shaft 3 without a datum (inner shaft penetrates a transfer or oil fan to be mounted in the transmission), since there is no portion of the inner shaft 3 that contacts the internal components of the transmission (cannot restrict the left movement of the bearing and the inner shaft in FIG. 9), a structure that can restrict the movement and insertion of the inner shaft 3 to the transmission at a certain location when the inner shaft 3 is installed may be needed. For this, as shown in FIG. 9, a stopper 112*c* may be formed at the bearing coupling part 112 of the bracket 110.

Referring again to FIG. 10, when the inner shaft 3 and the bearing 120 are coupled to the transmission (or decelerator) and the bracket 110, the separation preventing cover 130 may be located at the side of the bearing 120 to be coupled to the bracket 110.

In this case, the bolt coupling part 133 of the separation preventing cover 130 may be located on the coupling part 112*b* formed on the front surface of the bearing coupling part 112 of the bracket 110, and may be coupled to the coupling part 112*b* by the bolt 134. In this case, a portion of the edge of the flange 132 of the separation preventing cover 130 may be fitted into the groove 112*a* formed in the inner circumferential surface of the bearing coupling part 112 to be fixed.

FIGS. 12 to 16 are views illustrating a method of assembling a separation preventing cover 130 according to an exemplary embodiment of the present invention.

Figure 12:
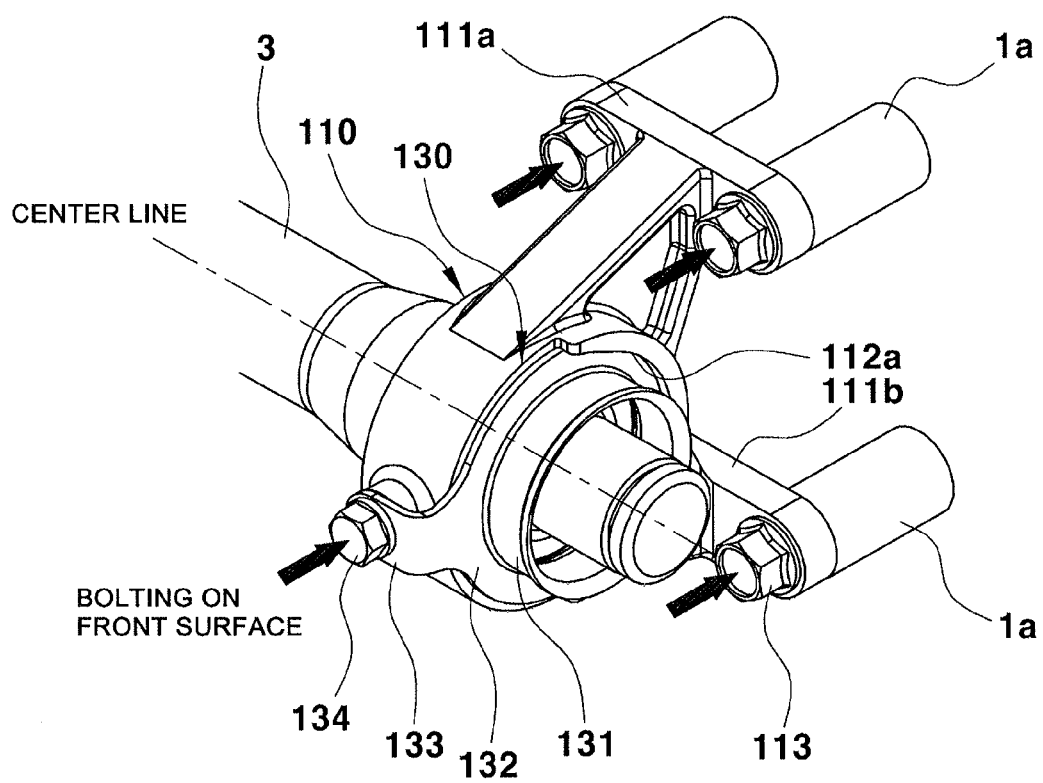
FIG. 12, FIG. 13, FIG. 14, FIG. 15 and FIG. 16 are views illustrating a method of assembling a separation preventing cover according to an exemplary embodiment of the present invention.

FIG. 12 illustrates the bracket 110 coupled to the coupling part 1*a* of the power train at two upper coupling parts 111*a* and one lower coupling part 111*b* by bolts.

Also, the bolt coupling part 133 of the separation preventing cover 130 may be coupled to the front surface of the bracket 110 by the bolt 134. In this case, a portion of the flange 132 of the separation preventing cover 130 may be fitted into the groove 112*a* formed along the circumferential direction in the inner circumferential surface of the bearing coupling part 112 of the bracket 110 to be fixed.

Figure 13:
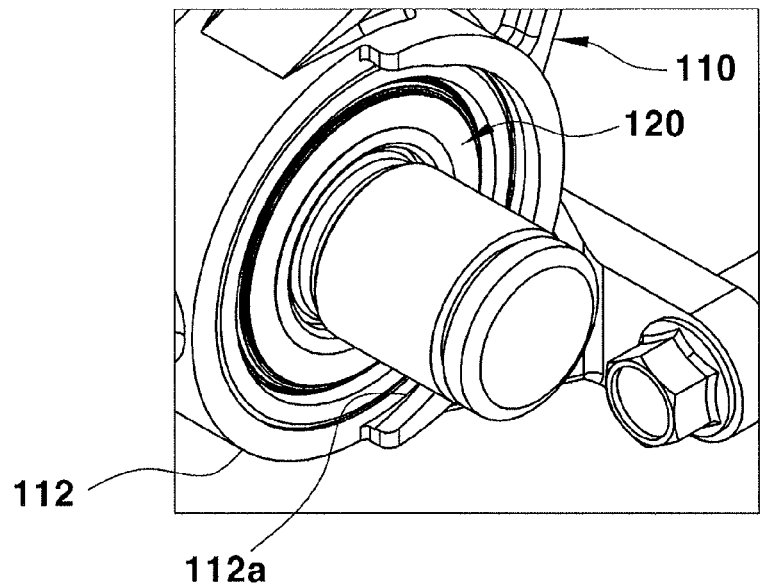

FIG. 13 illustrates the groove 112*a* which a portion of the flange of the separation preventing cover is inserted into and seated in. The groove 112*a* may be formed only at a rear portion of the inner circumferential surface of the bearing coupling part 112, not at the whole of the inner circumferential surface of the bearing coupling part 112.

Figure 14:
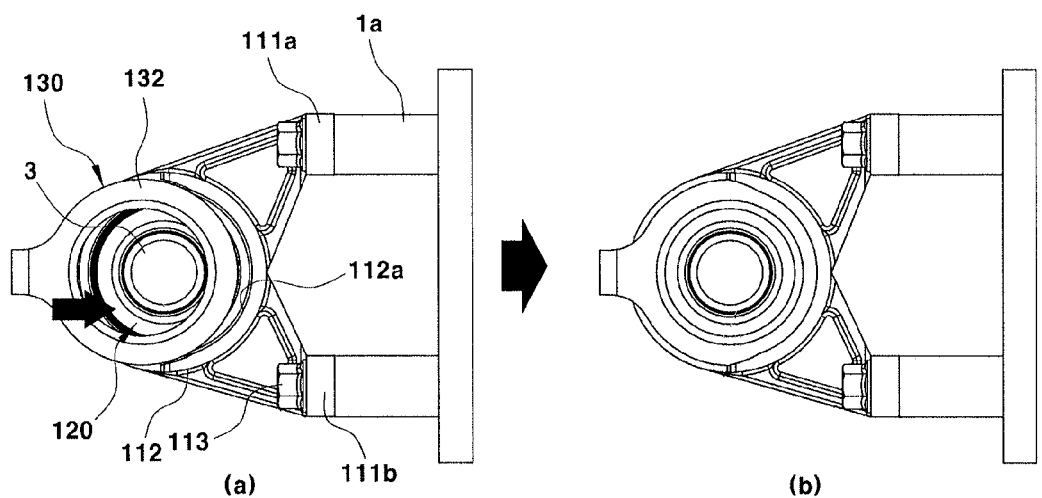

Accordingly, as shown in FIG. 14, the separation preventing cover 130 may be located at the side of the bearing 120 such that the edge portion of the flange 132 can be inserted into and seated in the inside of the groove 112*a*, and then the separation preventing cover 130 may be pushed to the rear side such that the edge portion of the flange 132 can be inserted into and seated in the inside the groove 112*a*.

In this state, when the bolt is inserted into the coupling aperture of the bolt coupling part 133 to be coupled to the coupling part of the bearing coupling part 112 of the bracket 110, the location of the separation preventing cover 130 may be completely fixed.

Figure 15:
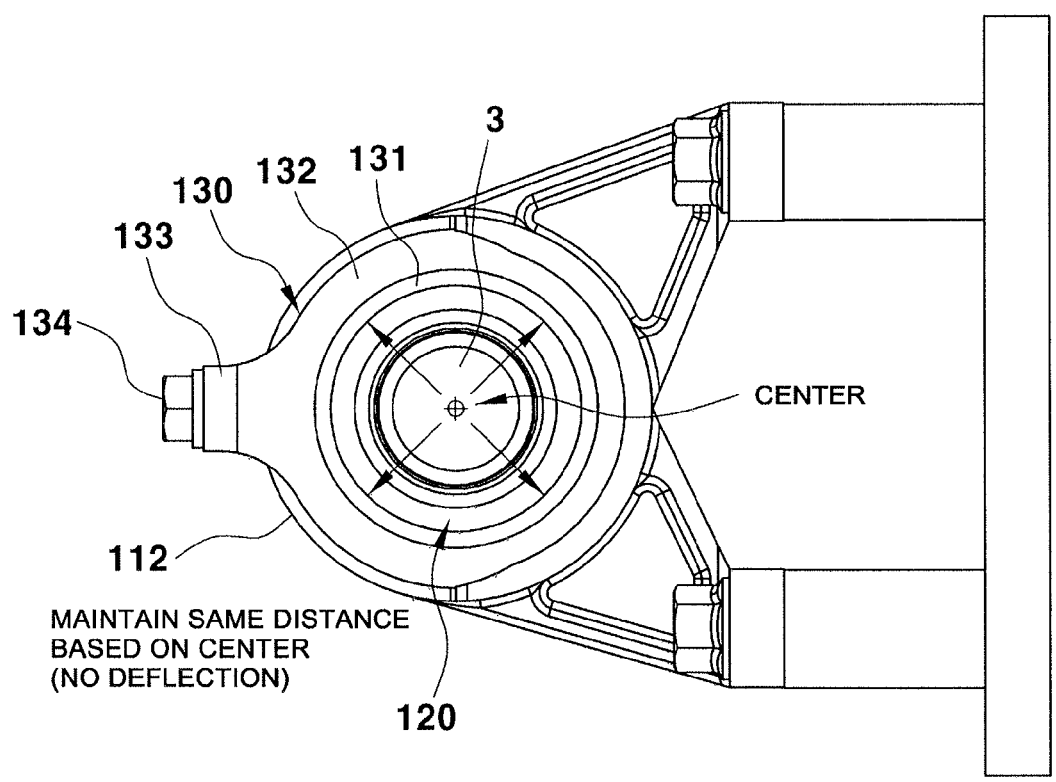

Referring to FIG. 15, since the flange 132 of the separation preventing cover 130 has a circular shape and a rear portion of the flange is fitted into the groove 112*a* of the bracket 110, the separation preventing cover 130 that is in an assembly state may be supported so as not to be biased to one side based on the bearing center.

Particularly, when the bolting structure is applied to the front surface of the bracket 110, the bolt 134 may be fastened to allow the flange 132 of the separation preventing cover 130 having a circular shape to be pushed to the rear side, and simultaneously, the flange 132 of the separation preventing cover 130 may be naturally inserted into and seated in the groove of the bracket 110 having a circular shape, maintaining the coupling force.

Also, a centering force may be generated such that the separation preventing cover 130 is not biased to one side. A force of pushing the bolt coupling part of the separation preventing cover by the bolt 134 and a repulsive force that is generated when the separation preventing cover (bolt coupling part) 130 and the bracket (bearing coupling part) 110 contact each other may act at the same time. In this case, the repulsive force may serve as a force of maintaining the centering by the cover 130.

Finally, the installation structure (bracket front surface coupling structure and flange groove fitting structure) of the separation preventing cover 130 may allow the separation preventing cover 130 not to be biased to one side, maintaining accurate centering in spite of shock or vibration.

In addition, upon rotation of the constant velocity joint, it is very important to prevent an interference between the separation preventing cover 130 fixed to the bracket 110 to prevent lateral separation of the inner shaft 3 and the bearing 120 and perform a dust cover function and the constant velocity joint (140 of FIG. 9) that rotates.

Particularly, the location of the separation preventing cover 130 needs to be stably fixed after assembly, even when shock or vibration occurs.

For this, it is very important to fix the separation preventing cover 130 such that the separation preventing cover 130 is not biased to one side from the rotation center of the constant velocity joint. When the foregoing installation structure is applied, it is possible to easily move the separation preventing cover to the center for the assembly, and to surely secure the maintenance of the centering after the assembly.

Also, when the assembling of components is performed only by bolts, the coupling force is maintained by a small surface pressure. On another hand, in addition to the bolting, since about half of the flange 132 of the separation preventing cover 130 is seated in the inside of the groove 112*a* formed in the bracket 110, the support surface of the separation preventing cover 130 increases, providing a larger separation preventing force.

When the support surface increases, the separation force can be dispersed over the whole of the support surface of the separation preventing cover 130. Accordingly, compared to the case where only the bolting is applied, the durability increases, and it is possible to reduce the size of the bolt as much as a force acting on the bolt decreases.

Also, the total number of bolts for the location fixation and coupling of the separation preventing cover 130 can be reduced (only one bolt is used for the front surface bolting), and thus the reduction of weight, manufacturing cost, and man-hour (improvement of assembly/maintenance characteristics) can be achieved.

Figure 16:
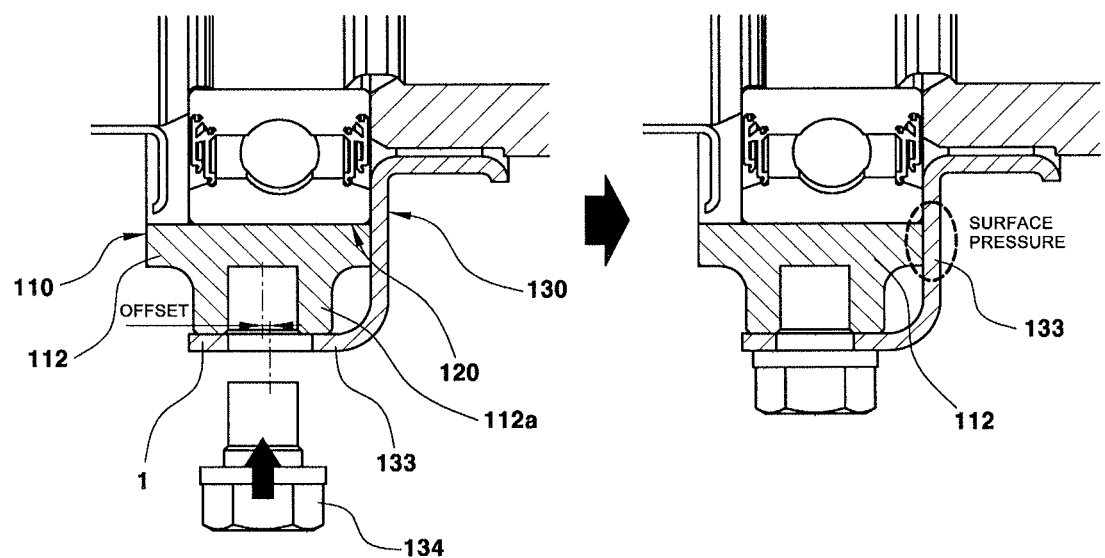

FIG. 16 is a cross-sectional view illustrating the shapes of the separation preventing cover 130 and the bolt coupling part 133 and the bolt coupling method, which shows that the separation preventing cover 130 and the bolt coupling part 133 are coupled to the coupling part on the front surface of the bearing coupling part 112 by bolts.

In the coupling of the separation preventing cover 130 and the bolt coupling part 133 by bolts, bolting may be applicable to either front surface or side surface of the bracket 110. However, when the bolt coupling part 133 is coupled to the front surface of the bracket 110 by bolts, the assembly characteristics can be improved.

Since there is no sufficient space to use tools due to engine auxiliary machinery components in the side surface of the bracket 110, the bolting of the side surface of the bracket 110 may be reduced in assembly characteristics. Accordingly, it is desirable to overlap the bolt coupling part 133 and the front surface of the bracket 110 for bolting.

Also, in this embodiment, since the bracket 110 and the bearing 120 are separately assembled, airtightness between the separation preventing cover 130 and the bracket needs to be maintained.

For this, an offset may be provided between the coupling aperture formed in the coupling part on the front surface of the bracket 110 and the coupling aperture formed in the bolt coupling part 133 of the separation preventing cover 130 to allow the bolt coupling part 133 of the separation preventing cover 130 to be pressurized on the side surface of the bearing coupling part 112 of the bracket 110 while being naturally and finely deformed in a lateral direction when being coupled by bolts.

That is, when being coupled by bolts, a slight surface pressure may be allowed to occur between contact surfaces of the bolt coupling part 133 of the separation preventing cover 130 and the bearing coupling part 112 of the bracket 110 in order to secure airtightness. In this case, since the dust cover function of the separation preventing cover 130 can be enhanced, the reduction of durability of the bearing 120 due to contamination and vibration/noise can be overcome.

The inner shaft supporting apparatus according to an exemplary embodiment of the present invention can improve the dynamic stiffness and the natural frequency characteristics of a bracket compared to a typical bracket with a cantilever structure, and thus can improve vibration and noise limitations, by adopting a method in which the bracket and the bearing are separated and first coupled to a coupling part of a power train and applying a bracket of a both-end coupling structure in which both upper and lower parts are coupled based on the bearing center.

Also, since a separation preventing cover that restricts the lateral separation of the bearing the axial movement of the inner shaft coupled to the bracket is disposed in a structure in which foreign substances and moisture are prevented from being introduced into a bearing part and a coupling part between the inner shaft and a constant velocity joint, a dust cover function for a corresponding part can be achieved only by the separation preventing cover without a separate dust cover.

In addition, the number of hardware for cover fixation can be reduced by optimizing the assembly structure of the separation preventing cover, and the reduction of the weight, manufacturing cost and man-hour (improvement of assembly/maintenance characteristics) can be achieved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An inner shaft supporting apparatus of a vehicle power train, comprising:
    a bracket coupled to a bearing, the bracket including:
        a bearing coupling part, wherein an outer ring of the bearing is seated in an inside of the bearing coupling part, and wherein an inner ring of the bearing is press-fitted into to be integrally coupled to an inner shaft; and
        an upper coupling part and a lower coupling part disposed at upper and lower part sides of the bearing coupling part, respectively, wherein the upper coupling part and the lower coupling part are fixedly coupled to a coupling part of the power train by a first bolt; and
    a separation preventing cover coupled to the bracket to prevent the bearing from being separated from the bracket and prevent an axial movement of the inner shaft, the inner shaft being integrally equipped with the bearing,
    wherein the separation preventing cover has:
        one side thereof coupled to the bracket by a second bolt; and
        another side thereof fixedly inserted into a groove formed in an inner circumferential surface of the bearing coupling part of the bracket.

2. The inner shaft supporting apparatus of claim 1, wherein the bearing coupling part of the bracket is formed in a shape of a ring to receive the bearing coupled to the inner shaft, and
wherein the upper coupling part and the lower coupling part having bolt coupling apertures to receive the first bolt are integrally formed on the bearing coupling part.

3. The inner shaft supporting apparatus of claim 1, wherein the separation preventing cover is coupled to a side of the bearing and covers a side surface of the bearing so as to prevent foreign substances and moisture from being introduced into a coupling part between the inner shaft and a constant velocity joint and the bearing coupling part.

4. The inner shaft supporting apparatus of claim 1, wherein the separation preventing cover includes:
    a tube formed such that a housing tube of a constant velocity joint coupled to the inner shaft is inserted into an inside of the tube while having a gap;
    a flange integrally formed at one side end of the tube and engaging with the groove; and
    a bolt coupling part integrally and longitudinally extending from the flange or the tube to be coupled to an outer side surface of the bearing coupling part of the bracket by the second bolt.

5. The inner shaft supporting apparatus of claim 4, wherein the groove of the bracket engaging with the flange is formed to have a circular arc shape only in at least a portion of a whole inner circumferential surface of the bearing coupling part.

6. The inner shaft supporting apparatus of claim 4, wherein the bolt coupling part of the separation preventing cover is coupled to a front surface of the bearing coupling part among an outer side surface of the bearing coupling part by the second bolt while overlapping the front surface of the bearing coupling part.

7. The inner shaft supporting apparatus of claim 6, wherein the groove of the bracket engaging with the flange is formed to have a circular arc shape only in at least a portion of a whole inner circumferential surface of the bearing coupling part.

8. The inner shaft supporting apparatus of claim 7, wherein the groove is formed only in a rear portion of the whole inner circumferential surface of the bearing coupling part.

9. The inner shaft supporting apparatus of claim 1, further including a dust cover coupled to the inner shaft and located on a side of the bearing at an opposite side of the separation preventing cover based on the bearing, so as to prevent foreign substances and moisture from being introduced while covering a gap between the inner shaft and the bearing coupling part.

10. The inner shaft supporting apparatus of claim 1, further including a stopper restricting the axial movement of the bearing and the inner shaft by a stopping action of the outer ring of the bearing at an opposite side of the bearing coupling part of the bracket to the separation preventing cover.

11. The inner shaft supporting apparatus of claim 1, wherein an offset is provided between a coupling aperture formed in the bearing coupling part of the bracket and the coupling aperture formed in the bolt coupling part of the separation preventing cover to allow the bolt coupling part of the separation preventing cover to be pressurized on a side surface of the bearing coupling part of the bracket while being deformed in a lateral direction when the coupling aperture of the bracket and the coupling aperture of the bolt coupling part are coupled by the first bolt.

12. The inner shaft supporting apparatus of claim 1, wherein a rib is connected to the upper coupling part, the bearing coupling part, and the lower coupling part.

* * * * *